United States Patent

Raith

[15] 3,690,770
[45] Sept. 12, 1972

[54] METHOD TO MEASURE MIRROR DEFLECTION

[72] Inventor: Siegfried Raith, Nelkenweg 23, D-8510, Fuerth, Germany

[22] Filed: Nov. 16, 1970

[21] Appl. No.: 89,697

[30] Foreign Application Priority Data

Nov. 18, 1969 Germany..........P 19 57 905.6

[52] U.S. Cl..............356/152, 250/217 CR, 250/230
[51] Int. Cl.............................................G01b 11/27
[58] Field of Search........356/153, 138, 152; 250/217 CR, 250/230

[56] References Cited

UNITED STATES PATENTS

| | | | |
|---|---|---|---|
| 3,270,612 | 9/1966 | Collyer | 356/152 |
| 3,161,715 | 12/1964 | Davidson | 356/152 |
| 3,470,377 | 9/1969 | Le Febre et al. | 356/138 |
| 2,903,598 | 9/1959 | Hoover, Jr. | 250/217 CR |
| 3,188,477 | 6/1965 | Ault | 250/217 CR |

Primary Examiner—Ronald L. Wibert
Assistant Examiner—Jeff Rothenberg
Attorney—Lewis H. Eslinger, Alvin Sinderbrand and Curtis, Morris & Safford

[57] ABSTRACT

A dynamic autocollimator telescope for measuring mirror deflections having a point source of light, a lens for converging the light, and beam splitter positioned between the light source and the lens for directing diverging light from the source to the lens. The lens converges the received light into parallel rays which are directly substantially normally onto the face of the mirror whose deflections are to be measured. The mirror reflects the incident parallel light back through the lens and the beam splitter which passes the reflected light to a photo detector located at the focal point of said lens. The detector generates electric signals proportional to the position of said light on the photo detector and the signals are used to adjust the position of the light source so that the reflected light always appears in the same location on the photo detector.

7 Claims, 2 Drawing Figures

Patented Sept. 12, 1972

3,690,770

Inventor:
SIEGFRIED RAITH
BY Curtis, Morris & Safford
Curtis, Morris & Saf
ATTORNEY

3,690,770

METHOD TO MEASURE MIRROR DEFLECTION

The invention relates to apparatus and method for measuring mirror deflections and particularly to such apparatus and method employing autocollimation techniques.

Autocollimation measurement techniques are frequently used in diversed technologies. Typical applications are in aligning machine parts parallel to each other or at right angles to each other. These techniques are also used to examine the flatness of surfaces such as guides.

An autocollimator is an apparatus in which diverging light from a slit or point is made parallel by passing through a lens; and the parallel light is directed perpendicularly onto a mirror surface for reflection therefrom back through the same lens to be focused at an exit slit or slits. As the mirror surface is deflected the reflected light will appear at different exit slits; by observing the location of the reflected light on different exit slits, a measurement is made of the amount of deflection of the mirror. A graticule and ocular may be provided in place of the exit slits, so that the angle or the amount of deflection of the mirror can be observed as the reflected point or stripe of light moves across the viewed graticule. By this technique, it is possible to visually observe and measure minute deflections of the mirror. However, the mirror deflections must be static (or moving very slowly) or else it is impossible to observe and measure the movement of the reflected image. Attempts at dynamic autocollimation measurements, i.e. to measure a non-static or moving deflection mirror, have heretofore employed electromechanical schemes and have been limited to relatively slow moving deflecting mirrors. The prior art dynamic autocollimation deflection measuring techniques had a long response time and could not measure rapid changes of the mirror. Furthermore, the previous device could only measure small regions or small angles. When the collimation technique is used over a flat surface of a guide, the autocollimation microscope of a dynamic kind could only be moved very slowly past the surface or else it would not measure or record surface irregularities.

These and other disadvantages of the prior art technique are overcome by the present invention by employing a point of light on the cathode ray tube as the light source. This light is then applied to a beam splitter which reflects and directs the converging light from the source towards a converging lens. The converging lens renders the diverging light rays parallel and directs them substantially perpendicular onto a mirror surface which is to be measured. The parallel light is reflected back from the mirrored surface through the lens. A photo detector is positioned at the focal point of the lens where the reflected light is focused. The photo detector is also connected to the deflection plates of the cathode ray tube. If the reflected image landing on the photo detector is not at the center of the detector, a signal is applied to the deflection plates of the cathode ray tube to reposition the point of light on the surface of the tube until the reflected image lands on the center or null point on the photo detector. The signals fed back to reposition the point of light on the face of the cathode ray tube thus provide an indication of the deflection of the mirror. Because the cathode ray tube can deflect the electron beam in the tube and the light appearing on the surface or face of the tube very, very rapidly, the response time of the measurement apparatus of this invention is very fast. Typically, it may be as fast as one-millionth-of-a-second in response time. Thus, very rapid changes in mirror deflections can be measured. The resolving power of measurements are determined to a large extent by the grain size of the cathode ray screen. For finer measurements, a finer grain screen may be used. Cathode ray tubes and feed back circuits can be constructed in which there is a linear relationship between the beam deflection (position of the point of light on the face of the cathode ray tube) and the mirror whose deflection is being measured.

According to an alternative embodiment of the invention, it is possible to add an intermediate image either at the emitting portion of the measurement device or at the receiving portion and thereby improve the exactness of the measurement.

It has been found desirable, moreover, to modulate the intensity of the point light source on the face of the cathode ray tube. This is typically done by amplitude modulating the electron beam inside the tube. A suitable filter or phase sensitive rectifying circuit is added to the photo detector for identifying the image that comes from the cathode ray tube. The advantages of modulating the light source and detecting its reflected image, are that other light that appears from the environment does not interfere with the measurements. This permits testing to be done in illuminated areas.

It will be appreciated that by suitable choice of the photo detector, for example, by a four-quadrant photo detector, it is possible to measure deflections of the mirror along two non-parallel axes, and thus measure deflection of the mirror in two coordinates.

According to the invention there is provided an apparatus for measuring mirror deflections including a point source of light, a lens for converging light, and beam splitter positioned between the light source and the lens for directing diverging light from the source to the lens. The lens converges the received light into parallel rays substantially normally onto the face of the mirror whose deflections are to be measured. The mirror reflects the incident parallel light back through the lens and the beam splitter which passes the reflected light to a photo detector which is located at the focal point of said lens. The detector generates electric signals proportional to the position of said light on the photo detector and the signals are used to adjust the position of the light source so that the reflected light always appears in the same position on the photo detector.

According to the invention, there is also provided a method for measuring deflections of a mirror surface including the steps of directing the beam of parallel light onto the surface of a mirror whose deflections are to be measured, sensing the position or movement of the reflected beam from a reference location as the mirror surface is deflected, and reposition the beam of light so as to return the reflected beam to the reference location in accordance with the sensed position of the reflected beam.

The construction of an illustrative embodiment as well as further objects and advantages thereof, will become apparent when read in conjunction with the accompanying drawings wherein.

Figure 1:
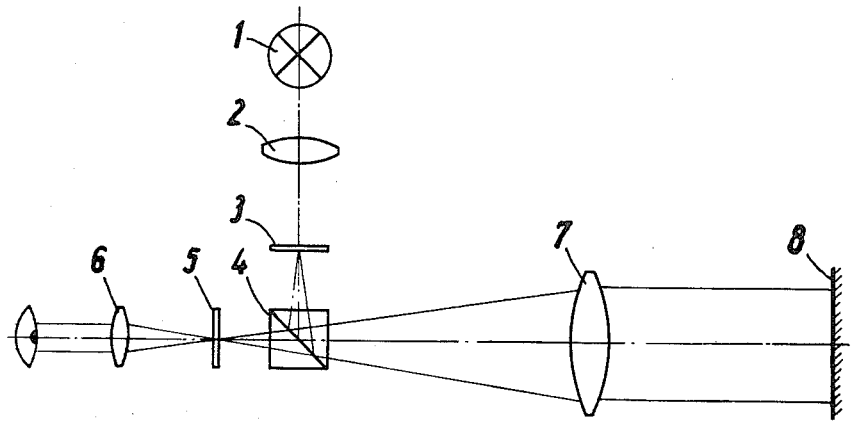
FIG. 1 is a schematic drawing of an autocollimator mirror deflection measuring device heretofore used.

Referring now to FIG. 1, there is shown an autocollimator of the prior art which is sometimes referred to as an autocollimator telescope. It provides a visual indication and measurement of the deflection of a mirror surface. The autocollimator telescope consists of a light source or lamp 1. Light from the source 1 passes through a condenser 2 and then through a plate having crosshairs at 3. The diverging light passes to a beam splitter 4 which directs the image of the light and crosshairs towards an objective lens 7. The lens 7 is a converging lens and converts the diverging rays of light into parallel light. The parallel light from the lens is directed substantially perpendicular to the mirror surface 8, whose surface deflection from the normal to the optical axis of the parallel light is to be measured. Light from the mirrored surface 8 is reflected back through the lens 7 and through the beam splitter 4. The light converges after passing through lens 7. The beam splitter passes the light to an ocular scale plate 5 which is located at the focal point of the lens 7. The image of the reflected crosshairs thus appears on the ocular scale plate, and it will be seen that the mirrored surface is either aligned with the center of the scale plate or displaced therefrom by a measurable amount. An ocular lens 6 converges the diverging light rays and directs them parallel towards an observer which is shown here by the schematic representation of an eye. Thus, the observer can line up the focused crosshair image on the scale plate graticule and record the deflection of the mirrored surface 8, from a previously defined normal alignment. Put another way, the deflection of the mirror 8 from the normal position to the optical axis of the autocollimator telescope causes a shift of the crosshairs from the center of the ocular scale plate 5 and can be read by an observer.

The disadvantages of the optical or manual autocollimator telescope is its slow speed of response or its inability to measure dynamic or rapid changes of deflection of the reflecting surface 8. Simply, a human observer cannot see and record the shift of the crosshairs as viewed through the ocular lens 6. Also, it is time consuming to record changes as well as being subject to human error.

Figure 2:
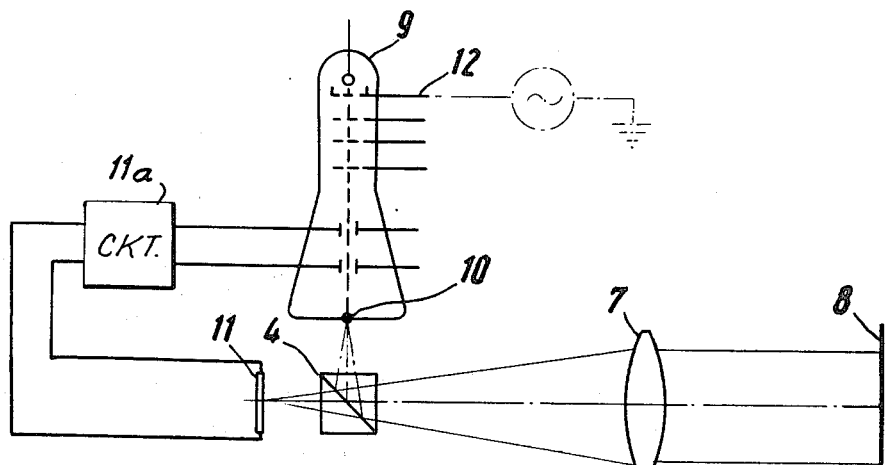
FIG. 2 is a schematic drawing of an autocollimator mirror deflection measurement apparatus according to the present invention.

Referring now to FIG. 2, there is shown therein a schematic drawing of an autocollimator apparatus for measuring mirror deflections according to this invention. Like elements in FIGS. 1 and 2 bear like legends. The light source 1, lens 2, and crosshairs 3 are replaced in FIG. 2 by a point light source 10 which is an illuminated spot on the face of a cathode ray tube 9. The point of light diverges onto the beam splitter 4, which directs the diverging light onto the converging lens 7. Lens 7 converges the diverging rays into a parallel beam of light and directs them along the optical axis of the rays towards the mirror surface 8 whose deflections are to be measured. Reflected light from mirror surface 8 passes through the lens 7 and is converged after passing through the beam splitter 4 on a photo sensitive detector 11. Detector 11 is a four-quadrant receiver, of the kind in which four photo detectors are located in four quadrants of a Cartesian coordinate. If the reflected point of light lands on the center of the detector, no signal is produced. If the reflected image lands, for example, in the first quarter or quadrant, two signals are produced and applied to the deflection means in the cathode ray tube to move the beam inside the cathode ray tube, and the point of light on the face of the cathode ray tube, such that the reflected and focused image falling on the detector 11 is brought to the center of the detecter, i.e. to its null or no signal position.

It might be helpful to consider a particular example. Assuming the point of light 10 is at the exact center of the cathode ray tube, the mirrored surface 8 is perpendicular with the optical axis of the light falling on it. The reflected point image from the mirror 8 lands on the detector at its center or null point. Assume that the mirror 8 is deflected counter clockwise about its central axis. Initially, the reflected light or the image point from the reflected light is moved downward on the photo detector plate 11. A signal is now produced in the photo detector 11 by the photo elements in the lower half of the detector. A signal is thus applied to the deflection means of the cathode ray tube and considering FIG. 2 as a two dimensional example only, the electron beam would be bent to the left so the light spot 10 would move to the left. This in turn would cause the reflected light image on photo conductor 11 to move upwards towards the null position. FIG. 2 shows a matrix circuit 11a connected between the photo detector 11 and the input to the vertical and horizontal deflection windings or plates on the cathode ray tube 9. The matrix circuit will include suitable amplification and buffering circuitry as well as circuits for directing the signal emanating from the photo detectors into suitable control signals to the proper deflection plates or windings.

The signals from the detector 11 contain information as to the position of the light spot image. The information concerns the two coordinates X and Y, and are proportional to the deflection of the mirror surface 8. It is possible to monitor these control signals to determine an indication of the deflection of a rapidly moving surface 8.

If the measurements of the surface are to be done in a lit room, it is desirable to keep ambient light from interfering with the measurements. One technique for accomplishing this end is to modulate the intensity of the light source 10. This may be easily done by amplitude modulating, or other modulation techniques of the electron beam generated inside the cathode ray tube. For example, by modulating one of the grids in the cathode ray tube or by applying an alternating voltage to the Wehnelt cylinder 12 of the cathode ray tube to influence the beam current and thereby the current of the light spot 10 on the screen. The image received on the detector 11 thus is amplitude modulated. This amplitude modulated signal can be separated from any ambient light by including a demodulator circuit or proper filter circuit in the matrix 11a.

Thus, there has been shown an autocollimation apparatus for measuring deflections of mirror surfaces in which a point source of light from an illuminated point on the face of a cathode ray tube diverges and is directed through a beam splitter and then to a convergence lens 7 which converts the converging rays into parallel beams of light. These parallel beams are directed towards the mirror surface whose deflections are to be measured. Light reflected from this surface is then passed back through the converging lens and the beam splitter and focused onto a photo detector. If the focused light on the photo detector is other than on the center, a signal is sent to the cathode ray tube to reposition the point or spot of light on the face of the tube so that the reflected and focused point of light will land on the center of the photo detector. By this arrangement, it is possible to perform dynamic measurements of mirror deflections when the speed of deflection is very rapid. The shift of the light source is proportional to the deflection of the mirror surface and these shifts can be recorded giving an indication of the deflection of the mirrored surface. Alternatively, the signals applied to the cathode ray tube from the photo detector can be recorded and used as measurements. The system has the further advantage of being able to measure with high resolution, by varying the grain size on the cathode ray screen. Linearity of measurement may be obtained by suitable selection of circuit components.

The above description of the invention is intended to be illustrative only, and various changes and modifications in the embodiment described may occur to those skilled in the art. These changes may be made without departing from the scope of the invention, and thus it should be apparent that the invention is not limited to the specific embodiment described or illustrated in the drawings.

What I claim is:

1. Apparatus for measuring mirror deflections comprising a point source of light; lens means for converging light, beam splitter means positioned between the light source and the lens means for directing diverging light from the source to the lens means; said lens means converging received light into parallel rays and directing said parallel rays substantially normally onto the face of the mirror whose deflections are to be measured; said mirror reflecting the incident parallel light back through the lens means and the beam splitter means; photodetector means for receiving a focused reflected image of the light passing back through the beam splitter means and for generating electric signals proportional to the position of said image on the photodetector means, and means responsive to said signals for adjusting the position of the light source so that the reflected light image always returns to the same position on the photodetector means.

2. Apparatus for measuring mirror deflections comprising a point source of light; lens means for converging light; beam splitter means positioned between the light source and the lens means for directing diverging light from the source to the lens means; said lens means converging received light into parallel rays and directing said parallel rays substantially normally onto the face of the mirror whose deflections are to be measured; said mirror reflecting the incident parallel light back through the lens means and the beam splitter means; photodetector means for receiving a focused reflected image of the light passing back through the beam splitter means for generating electric signals proportional to the position of said image on the photodetector means, and means responsive to said signals for adjusting the position of the light source so that the reflected light image always returns to the same position on the photodetector means, said point source of light being a spot on the face of a cathode ray tube and the electric signals from the detector means being applied to the deflection means of the cathode ray tube for positioning the light spot on the face of the tube.

3. An apparatus according to claim 2, wherein means are provided for modulating the intensity of the light source, and said detector means includes means for identifying and providing said signals in response to the modulated light only.

4. An apparatus according to claim 3, wherein said modulating means includes means for modulating a beam in the cathode ray tube.

5. An apparatus according to claim 4, wherein said modulating means includes means for applying an alternating current to a Wehnelt cylinder.

6. An apparatus according to claim 2, wherein said photo detector means is a four-quadrant receiver.

7. A method for measuring deflections of a mirror surface including the steps of supplying a point source of light, converging light received from said source into parallel rays and directing said parallel rays substantially normally onto the face of a mirror whose deflections are to be measured; said mirror reflecting the incident parallel light rays therefrom, focusing the reflected parallel light rays into a focused reflected image of the light source on a photodetector means; generating electrical signals proportional to the position of said image on the photodetector means, and adjusting the position of the light source in response to said signals so that the reflected light image always returns to the same position on the photodetector means.

* * * * *